(12) United States Patent
Valdes

(10) Patent No.: US 10,306,920 B1
(45) Date of Patent: Jun. 4, 2019

(54) CIGARETTE SMOKE FILTRATION APPARATUS

(71) Applicant: Sergio Valdes, Miami Lakes, FL (US)

(72) Inventor: Sergio Valdes, Miami Lakes, FL (US)

( * ) Notice: Subject to any disclaimer, the term of this patent is extended or adjusted under 35 U.S.C. 154(b) by 14 days.

(21) Appl. No.: 16/107,121

(22) Filed: Aug. 21, 2018

(51) Int. Cl.
  *A24F 13/06* (2006.01)
  *B01D 53/02* (2006.01)
  *F23Q 7/22* (2006.01)
  *F23Q 7/16* (2006.01)

(52) U.S. Cl.
  CPC .............. *A24F 13/06* (2013.01); *B01D 53/02* (2013.01); *F23Q 7/16* (2013.01); *F23Q 7/22* (2013.01); *B01D 2253/102* (2013.01)

(58) Field of Classification Search
  None
  See application file for complete search history.

(56) References Cited

U.S. PATENT DOCUMENTS

| 5,160,518 A | 11/1992 | Vega, Jr. | |
| 5,598,853 A * | 2/1997 | Hyre | A24F 13/00 131/175 |
| 2018/0116276 A1* | 5/2018 | Prog | A24D 3/04 |

\* cited by examiner

*Primary Examiner* — Michael J Felton
*Assistant Examiner* — Katherine A Will
(74) *Attorney, Agent, or Firm* — Sanchelima & Associates, P.A.; Christian Sanchelima; Jesus Sanchelima

(57) ABSTRACT

The present invention provides a cigarette smoke filtration apparatus. The said apparatus includes a telescopic cigarette holding unit for holding a cigarette which may be retracted into a housing when the apparatus is not in use. The apparatus includes a filtration unit to filter the smoke from the cigarette before being discharged. The apparatus includes one or more fans to introduce fresh air into the housing to allow for the cigarette to burn and also to suck smoke out of the housing. The apparatus also includes an ignition coil to light the cigarette and a wire mesh to trap ash from the burning of the cigarette. The apparatus further includes a valve assembly having one or more one-way exhaling valves for exhaling the smoke out and one one-way for inhaling valve for inhaling the smoke from the burning cigarette because users like resistance when inhaling but not when exhaling.

19 Claims, 8 Drawing Sheets

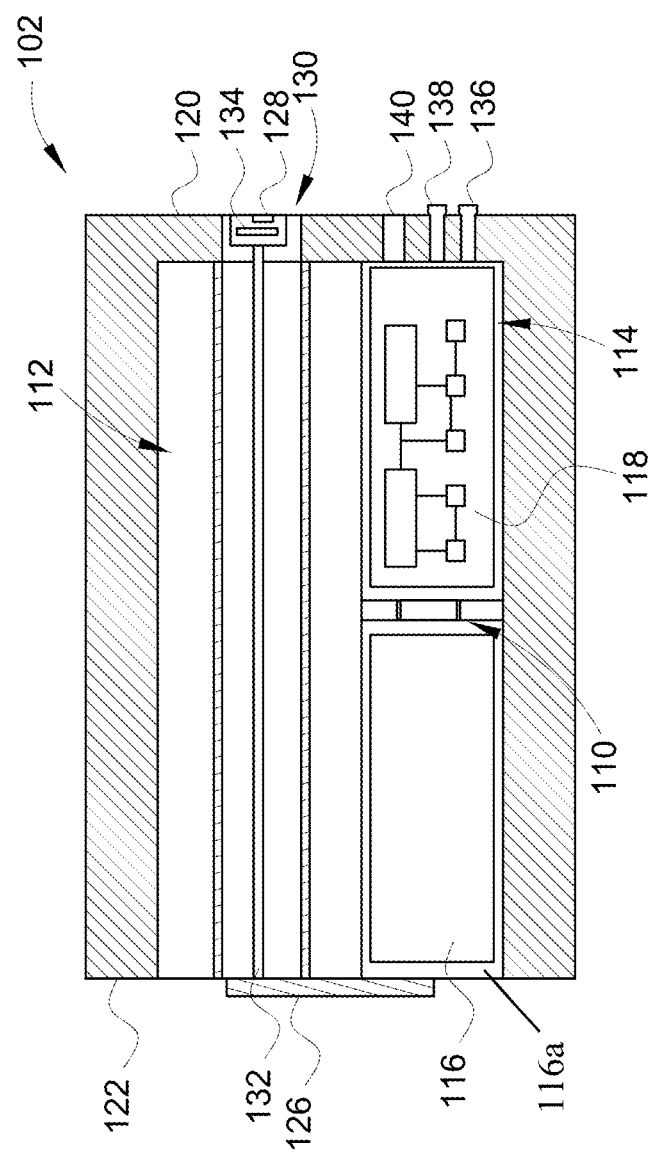

CIGARETTE SMOKE FILTRATION APPARATUS

BACKGROUND OF THE INVENTION

1. Field of the Invention

The present disclosure generally relates to an apparatus for holding a cigarette for smoking; and more particularly relates to an apparatus for filtering smoke caused by smoking of the cigarette held therein.

2. Description of the Related Art

Cigarette smoking leads to unwarranted smoke which may be fine with the person who is smoking, but such smoke also affects the surrounding environment, at times to the discomfort of other people who are close by. Cigarette smoke is generally considered objectionable by many people and has led to no-smoking laws in certain environments, such as indoors, like office premises, and public spaces. As a result, the person who prefer to smoke has to leave office premises or such other restricted areas, and travel to outdoors for having a smoke. This may be a huge hassle and even lead to waste of time for that person. Sometimes even outdoors, for examples, in crowded places, the cigarette smoke may possibly affect the comfort of others nearby, and thus the person who prefer to smoke may be left with no option.

The dangers of smoking cigarettes are not limited to those associated with the inhalation of cigarette smoke. In addition to adversely affecting the health of non-smokers, secondary smoke contaminates exposed articles, such as furniture, clothes, car upholstery, and air conditioners. Such contamination may impart offensive odors and otherwise damage the effected articles. Furthermore, many lives are lost, and an extraordinary amount of property is damaged, as a result of fires caused by the careless disposal of lit cigarettes.

In order to cater to living habits of smokers, while preventing harmful substances from the cigarette smoke into the body of passive smokers, it is required to filter the exhaust smoke before it being discharged into the environment. Some cigarette smoke filtration process methods and products, and even cigarette smoke purification treatment devices, are known. However, existing commonly used devices designed for filtering cigarette smoke either cannot achieve satisfactory filtration effect, or are not convenient to use, e.g. may not provide satisfactory suction effect as desired during smoking of the cigarette. Some new devices are employing complicated design and mechanisms to overcome such issues with existing devices.

Applicant believes that a related reference corresponds to U.S. Pat. No. 5,160,518 (hereinafter referred to as '518 patent) which discloses an air tight cylindrical U shaped or angled tube that can be assembled and disassembled. The U tube is constructed of polystyrene or another non-flammable material. A fan unit pushes fresh air into one end of the combustion chamber tube. A cigar or cigarette is held within the combustion chamber tube with a stainless-steel support. The smoking medium is ignited via an ignition access port. One can inhale smoke via a one-way inhalation valve. Then, one can exhale secondary smoke into a filtration chamber tube via a one-way exhalation valve. Primary and secondary smoke are filtered within the unit by an activated carbon filter prior to returning to the outside environment.

The device of the '518 patent does provide some improvements over the conventionally known cigarette smoke filtration devices. However, the disclosed device still suffers from some limitations. The disclosed device does not provide any means to check how much of the held cigarette has been consumed. Further, such device does not provide any means to provide different level of resistances between inhaling and exhaling of the cigarette smoke, which is desirable in order to add natural feel to the cigarette smoking while using a cigarette filtration device.

Other documents describing the closest subject matter provide for a number of more or less complicated features that fail to solve the problem in a convenient and efficient manner. None of these documents suggest the novel features of the present invention.

SUMMARY OF THE INVENTION

It is one of the main objectives of the present invention to provide a cigarette smoke filtration apparatus for filtering smoke from a tobacco product, such as a cigarette, but not limited to dry herbs, with which the passive smoker is protected from harmful substances from the smoke.

It is still another objective of the present invention to provide a cigarette smoke filtration apparatus which can provide different levels of resistance during inhalation and exhalation of the smoke to provide natural feel while smoking a cigarette using the same.

It is another objective of the present invention to provide a cigarette smoke filtration apparatus which is portable to carry, inexpensive to manufacture and convenient to use.

It is yet another objective of the present invention to provide a cigarette smoke filtration apparatus which can be easily cleaned after use.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 illustrates a sectional view of a housing of the cigarette smoke filtration apparatus of FIG. 1;

DETAILED DESCRIPTION OF THE EMBODIMENTS OF THE INVENTION

Figure 1A:
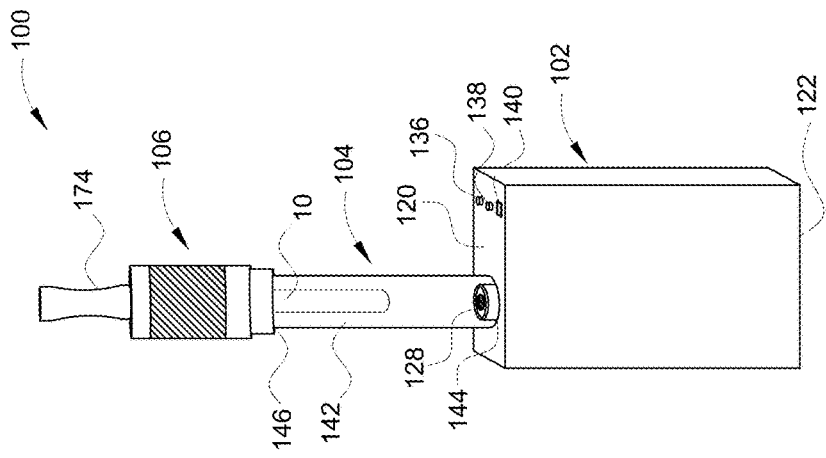
FIG. 1A illustrates a depiction of the cigarette smoke filtration apparatus of FIG. 1 when being implemented for smoking a cigarette.

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Referring to the drawings, FIGS. 1-4 illustrate various diagrammatic views of a cigarette smoke filtration apparatus (hereinafter, simply referred to as "apparatus" and generally designated by the numeral 100), in accordance with an embodiment of the present disclosure. The apparatus 100 has been designed to function both as a cigarette holder and a smoke filtration device. That is, the apparatus 100 hold a cigarette (shown with referral numeral 10 in various drawings) and filter the smoke resultant from the smoking of such held cigarette 10 therein. As illustrated, the apparatus 100 generally includes a housing 102 to enclose various components thereof, a cigarette holding unit 104 adapted to hold the cigarette 10 and can be telescopically disposed with respect to the housing 102, a valve assembly 106 associated with the cigarette holding unit 104, a filtration unit 108 provided within the housing 102, and electronic circuitry 110 also provided within the housing 102 isolated from other components therein. Cigarette holding unit 104 is defined as a first tube that is inserted into a first chamber located within housing 102. The exhaled air is blown into the first chamber through cigarette holding unit 104 and escapes from the bottom of the first tube. From there the exhaled air leaves the first chamber through openings located on the top and/or bottom of the first chamber and into a filtration section that includes filtration unit 108. Filtration unit 108 includes a top filtration unit 108*a* to remove nicotine and tar and a bottom filtration unit 108*b* to remove odors and gases. Once the exhaled air travels down filtration unit 108 the exhaled air is finally released from housing 102 through fan openings 129. This embodiment includes a second chamber that is used to house a battery. The battery is covered using a cap that can be pushed on or screwed on. The cap comes into abutting engagement with the top of the battery to serve as ground as it is coupled to the housing 102 that can be made of a conductive material such as aluminum. At the bottom of the second chamber there is an electronic assembly that receives the positive power from the battery. The electronic assembly is then connected to the fan 126 and the coil and the actuating buttons.

Figure 5:
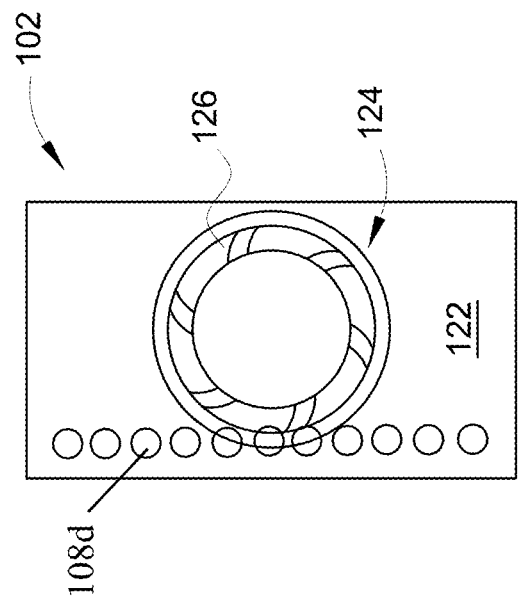
FIG. 5 illustrates a bottom view of housing of a cigarette smoke filtration apparatus, in accordance with another embodiment of the present disclosure.
Figure 6:
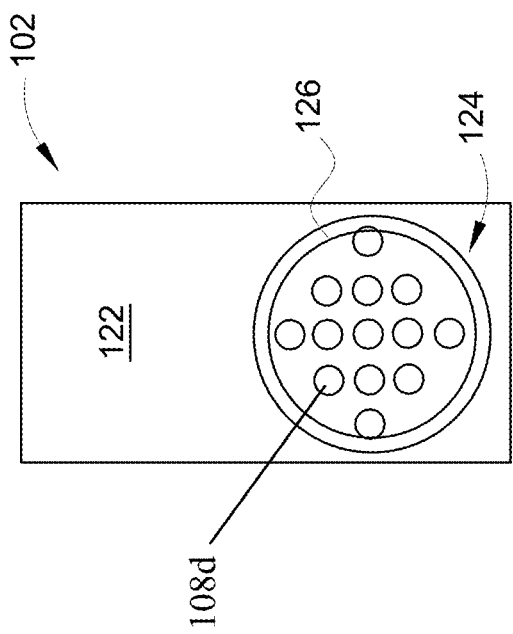
FIG. 6 illustrates a bottom view of housing of a cigarette smoke filtration apparatus, in accordance with another embodiment of the present disclosure.

In another embodiment, the exhaled air again enters the first chamber using the cigarette holding unit 104 and then escapes through the bottom of the first tube and travels through channel 102*a* into a second chamber. Second chamber can be cylindrical or tubular. The second chamber is fitted with a filtration unit 108 as well. The filtration unit 108 is again divided between an upper filtration unit 108*a* and lower filtration unit 108*b*. Once the tar, nicotine, gases, and odors have been filtered out of the exhaled air it is then suctioned by the fan 126 and out through fan openings 129. In this embodiment, housing 102 includes a battery compartment on its front or rear perimeter wall that receives the battery. The battery can be a flat battery. FIG. 5 can be shown to represent how the fan openings 129 appear in the second embodiment. FIG. 6 can be shown to represent how the fan openings 129 appear in the first embodiment.

In either embodiment, cigarette holding unit 104 is defined as a first tube that is inserted into the first chamber of either embodiment through its bottom end. The top end of the first tube is mounted to valve assembly 106.

As illustrated, the housing 102 is of generally rectangular and oval plan configuration; however, in other examples, the housing 102 may have different shapes without any limitations. In one or more examples, the housing 102 has a molded plastic or aluminum body which may be disassembled for accessing the internal components thereof. The housing 102 may be constructed primarily of non-toxic, non-flammable, conductive materials. As illustrated more clearly in FIG. 2, the housing 102 has been generally divided or bifurcated into two chambers; a first chamber 112 which is adapted to receive the cigarette holding unit 104 therein, and a second chamber 114 which in the first embodiment is hermetically sealed from the first chamber 112. This is because in the first embodiment the electronic assembly and battery are housed within the second chamber 114 and cannot come into contact with the gases, nicotine, tar, or other byproducts from the exhaled air. In the second embodiment, the second chamber 114 is connected to the first chamber 112 through channel 102*a* that allows air that has escaped from the bottom of the first tube to be transferred to the second chamber. As shown, the electronic circuitry assembly 110 includes a battery 116 and, optionally, a driver circuit 118 which connects the battery 116 to supply power therefrom to various other electronic components of the apparatus 100 (as discussed in the subsequent paragraphs). In the present examples, the battery 116 is a rechargeable DC battery which is well known in the art and readily available in the market. In the first embodiment, the battery 116 and the electronic circuitry assembly 110 are housed within second chamber 114. In the second embodiment, the battery 116 and the electronic circuitry assembly 110 are located in battery compartment 116*a*.

The present invention includes a filtration unit 108 that can be subdivided as upper filtration unit 108*a* that can be made of a fiber material that removes tar and nicotine. Filtration unit 108 also includes lower filtration unit 108*b* that can be made of activated carbon to remove gases and odors. In the first embodiment, filtration unit 108 is located within filtration compartment 108*c* that is connected to the first chamber 112 through holes at the top and/or bottom of the first chamber 112. In a preferred embodiment, smoke escape holes can be located at the top of the first chamber 112. The filtration compartment 108*c* can define an entire or substantial amount of a rear or front perimeter wall of housing unit 102. In the first embodiment, filtration compartment 108c includes filtration escape openings 108d that allow the filtered air to be suctioned by fan 126 therethrough. In a preferred embodiment, filtration escape openings 108d are located at the bottom of filtration compartment 108c.

In the second embodiment, filtration unit 108 is located in second chamber 114. Exhaled air travels from first chamber 112 to second chamber 114 through channel 102a. The air is then filtered within second chamber 114 and in the second embodiment the second chamber has filtration escape openings 108d directly underneath and is connected to fan 126 therethrough that suctions the filtered air out of second chamber 114. As shown, the first chamber 112 provides an elongate chamber (which acts as a combustion chamber) into which the smoke from burning of the cigarette 10, held by the cigarette holding unit 104, is introduced. The purpose of the filtration unit 108 is to remove substantially all of the particulate material in the cigarette smoke. It may be contemplated that other suitable filter materials may be used without any limitations. The filtration unit 108 is generally of sufficient cross-section thickness to achieve required particulate component removal from the cigarette smoke as the smoke passes through either the filtration compartment 108c in the first embodiment or second chamber 114 in the second embodiment.

As may be seen from FIGS. 1-4, the housing 102 has a top face 120 and a bottom face 122. The apparatus 100 includes a fan 126 that will be mounted to bottom face 122 in either embodiment. The fan 126 is configured to suction air from the atmosphere. Fan 126 draws air through the exhaling valve (cigarette holding unit 104 or first tube), and then the suctioned air is also suctioned from the are used to filter the exhaled air (filtration compartment 108c in the first embodiment or second chamber 114 in the second embodiment) and finally the atmospheric air is suctioned out of filtration escape openings 108d. Fan 126 serves two purposes, first it facilitates the filtration of the exhaled air and second it introduces oxygen into the housing 102 for supporting burning of the cigarette 10. Fan 126 is capable of generating an amount of CFM (cubic feet per minute) of volumetric air flow to create an effective amount of suction to remove the filtered air and maintain the cigarette burning. In some examples, the apparatus 100 may include two or more fans 126 in order to create sufficient volumetric flow of fresh air into the first section 112 of the housing 102. In the present examples, the fan 126 is a DC fan powered by the battery 116, via the driver circuit 118. Further, in some examples, the bottom face 122 may be provided with a lid (not shown) to cover the fan 126, when the apparatus 100 is not being used. The housing 102 can also include a cap to cover the mouthpiece.

Figure 2A:
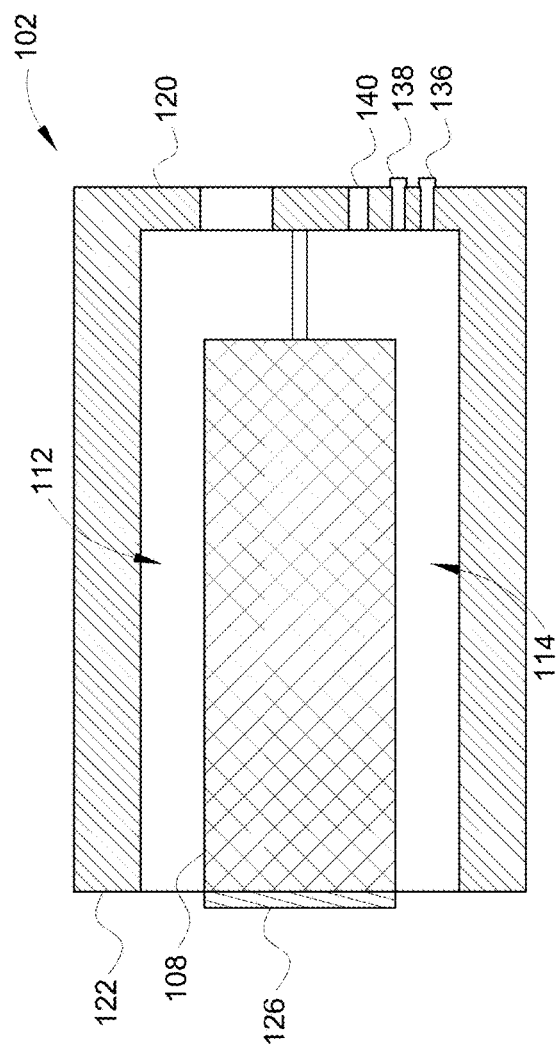
FIG. 2A shows a rear view of the first embodiment having filtration unit 108 within filtration compartment 108c and smoke escape holes.
Figure 4:
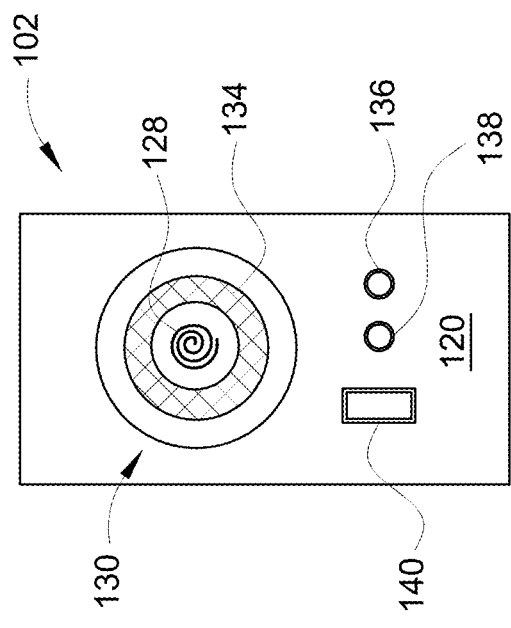
FIG. 4 illustrates a top view of the housing of FIG. 2.
Figure 3:
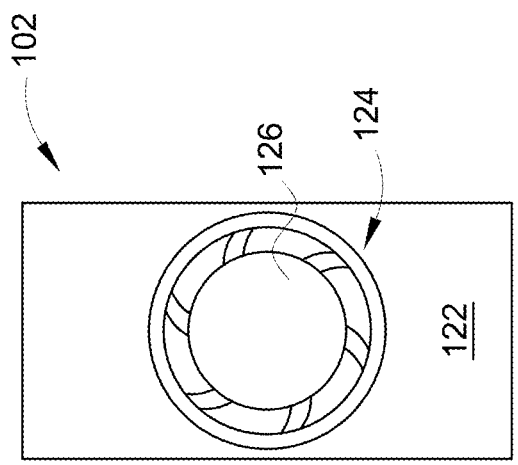
FIG. 3 illustrates a bottom view of the housing of FIG. 2.

Further, as illustrated more clearly in FIG. 4, the apparatus 100 includes an ignition coil 128 which is generally positioned in an opening 130 in the top face 120 corresponding to the first chamber 112, in the housing 102. It may be seen that the ignition coil 128 is generally located in the same plane as the top face 120 and where a tip of the cigarette 10, held in the cigarette holding unit 104, would be disposed when the apparatus 100 is being used. In one or more examples, the ignition coil 128 may generally be a resistive heating element and is configured to heat up which can be used for lightning the tip of the cigarette 10 when in contact by telescopic action therewith. It may be understood that the ignition coil 128 is electrically connected to the battery 116 via the driver circuit 118 in order to withdraw electric energy for heating up. As may be seen from FIG. 2, the ignition coil 128 is supported from a bottom of the first chamber 112 via an elongate support column 132 extending through the length of the first chamber 112, such that there is a radial gap between the support column 132 and the walls of the first chamber 112. Support column 132 can be narrower or wider than how it is shown in FIG. 2.

In some examples, the apparatus 100 includes a wire mesh 134 provided along flanges of the ignition coil 128 and supported on the support column 132 therewith. The wire mesh 134 can be flush with opening 130 and is adapted to capture ash fallen from the tip of the cigarette 10, when the apparatus 100 is being used, this to prevent ash from falling inside the first chamber 112. As may be contemplated, the wire mesh 134 may be removable from the housing 102, and may be washed after every use or replaced with a new wire mesh after a certain number of cigarettes have been smoked in the apparatus 100. In some examples, the wire mesh 134 may also act as a spark suppressor for the ignition coil 128, in order to prevent any fire hazard due to accidental activation of the ignition coil 128. For such purposes, the wire mesh 134 may be made of fire-proof metallic materials, such as stainless steel, or non-ferrous material and the like.

Further, as illustrated in FIG. 4, the driver circuit 118 includes various switches provided on the top face 120 of the housing 102 and implemented for controlling the various electronic components of the apparatus 100. In particular, the driver circuit 118 includes a first switch 136 which may be operated to switch ON/OFF the fan 126 therein. In some examples, the first switch 136 may be a variable speed switch which may be operated to control the speed of rotation of the fan 126, and thereby regulate the volumetric flow of fresh air into the first section 112, and thus may be implemented for controlling the burn rate of the cigarette 10, in the apparatus 100. Fan 126 is used to suction air out after it has been filtered. Further, the driver circuit 118 includes a second switch 138 which may be operated to switch ON/OFF the ignition coil 128 in order to light the cigarette 10 held in the cigarette holding unit 104 when required. It may be understood that the switches 136, 138 may be connected to the corresponding electronic component via one or more wires (not shown for the sake of clarity) and control the flow of electric current from the battery 116 to the corresponding electronic component. Battery 116 in other embodiments may be located at different locations of apparatus 100. Further, the driver circuit 118 includes a port 140 to receive a power inlet in order to recharge the battery 116. It may be contemplated that although the switches 136, 138 and the port 140 have been shown to be arranged on the top face 120 of the housing 102, these switches 136, 138 and the port 140 may be located at any other suitable located on outside of the housing 102 without any limitations.

Figure 1:
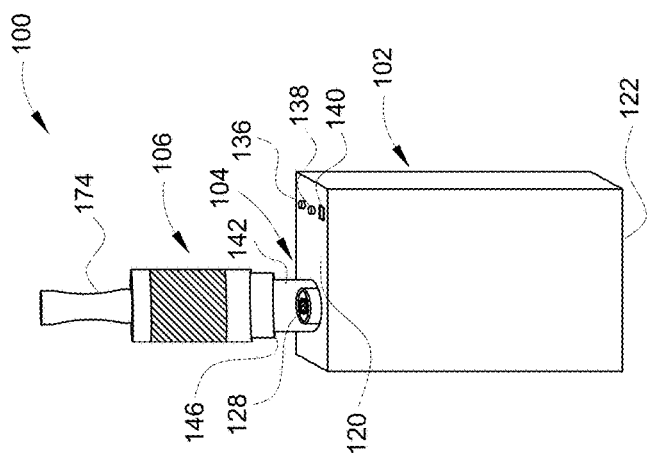
FIG. 1 illustrates a diagrammatic view of a cigarette smoke filtration apparatus, in accordance with one or more embodiments of the present disclosure.

FIG. 1A, when viewed in reference to FIG. 1, depicts the telescopic arrangement of the cigarette holding unit 104 with respect to the first section 112 of the housing 102. The cigarette holding unit 104, primarily, includes an elongate hollow cylindrical tube 142 which is open from one end 144 and the valve assembly 106 is removably coupled to its other end 146 using a rubber O-ring or threads. As may be seen, the tube 142 may be pushed into the first chamber 112 of the housing 102 through the opening 130. In the present examples, an inner diameter of the tube 142 may be slightly larger than an outer diameter of the support column 132 and the ignition coil 128 so that the tube 142 may slide into the first section 112 without any obstruction and to allow the smoke flow. Further, a length of the tube 142 may be slightly larger than the length of the first chamber 112 such that when the tube 142 may slide into the first chamber 112, its end 144, and thereby the valve assembly 106, may be placed slightly above the top face 120 of the housing 102. In some examples, the length of the tube 142 may also be generally based on a length of the cigarette 10 held therein. The tube 142 may be provided with O-ring or the like (not shown) at the end 144 which helps to keep the tube 142 supported and sealed within the first chamber 112 of the housing 102. Valve assembly 106 can be pressure mounted or screwed into tube 142. In one or more embodiments, the tube 142 is made of transparent material, such as, but not limited to, glass, so that the cigarette 10 held therein is visible in order to conveniently monitor how much of the cigarette 10 has been burned during smoking thereof, and further aid with how much the cigarette 10 needs to be pushed to approach the ignition coil 128.

Figure 8:
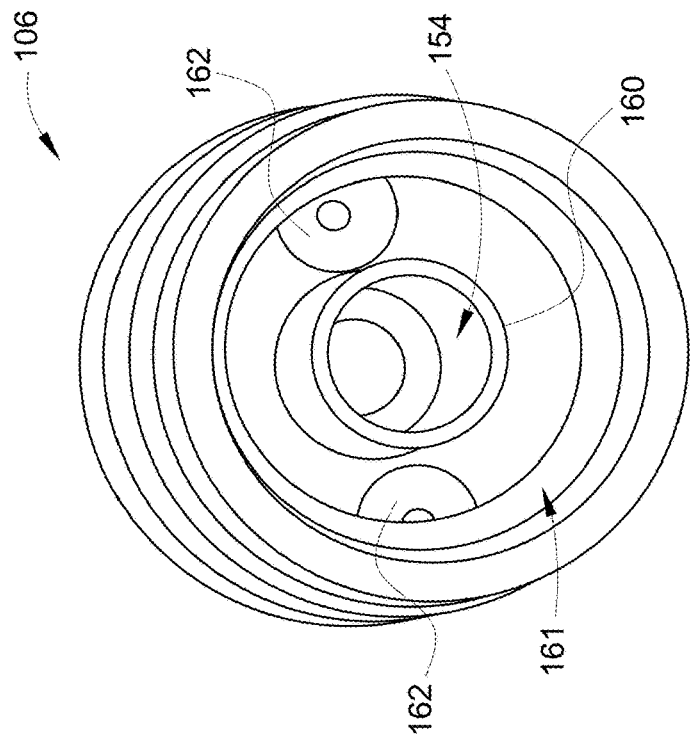
FIG. 8 illustrates a bottom view of the valve assembly of FIG. 7.
Figure 7:
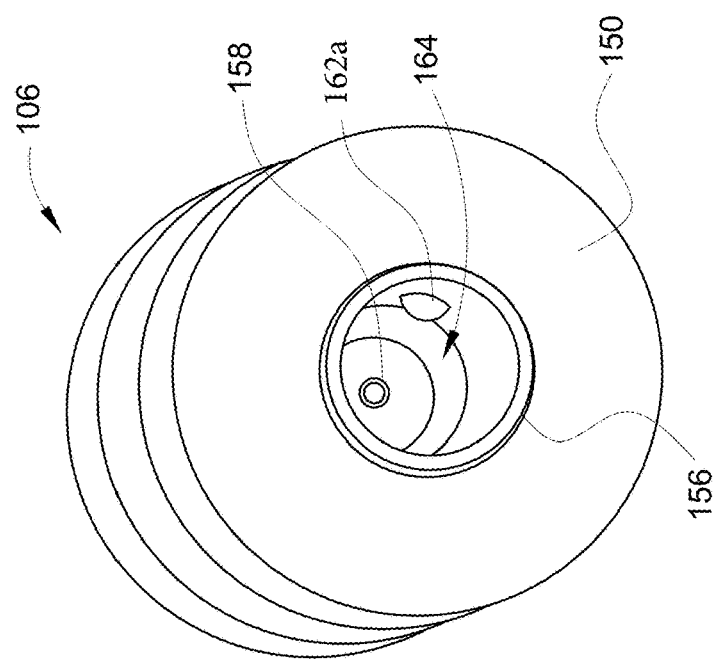
FIG. 7 illustrates a top view of a valve assembly for the cigarette smoke filtration apparatus of FIG. 1, in accordance with one or more embodiments of the present disclosure.
Figure 9:
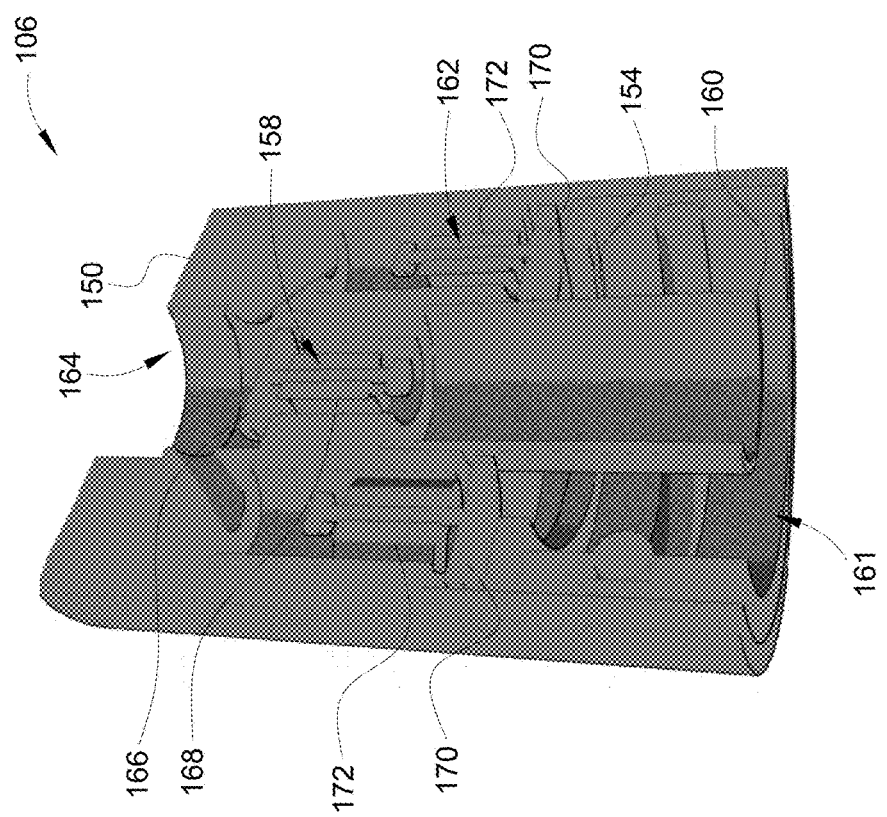
FIG. 9 illustrates a section view of the valve assembly of FIG. 7.
Figure 10:
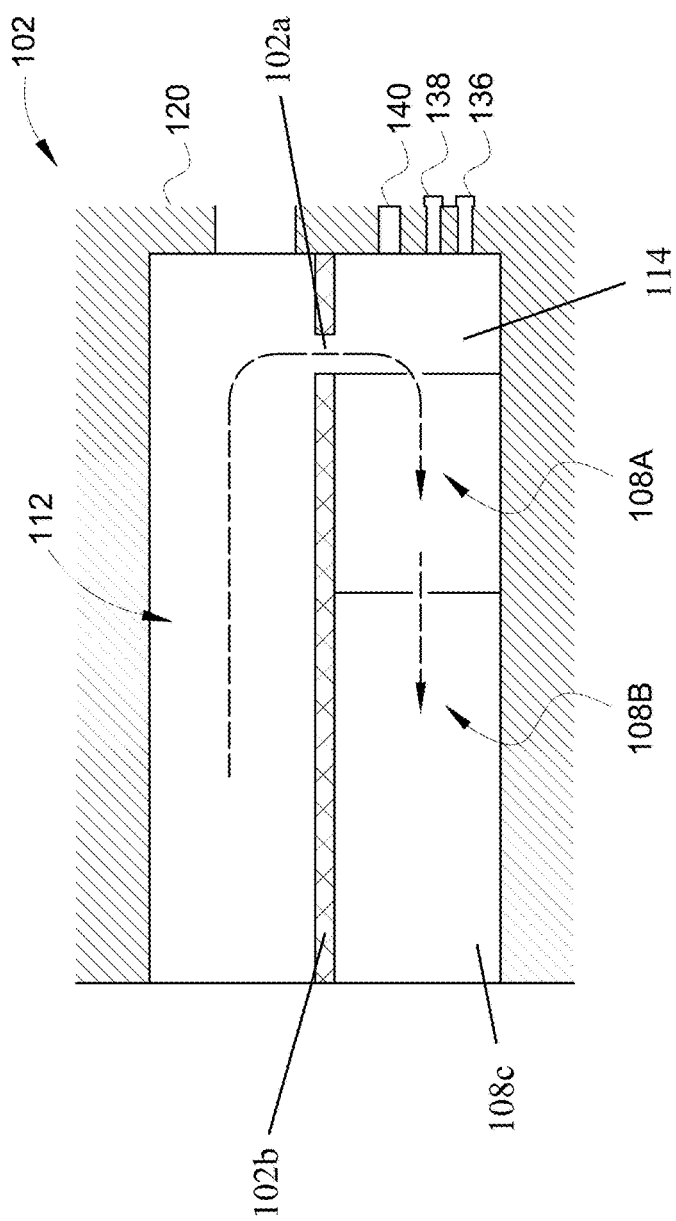
FIG. 10 shows an isometric see-through view of the second embodiment showing first chamber 112 separated from second chamber 114 using partition 102*b*.

FIGS. 7-9 illustrate different diagrammatic views of the valve assembly 106, in accordance with an embodiment of the present disclosure. In particular, FIG. 7 illustrates a top view of the valve assembly 106, and FIG. 8 illustrates a bottom view of the valve assembly 106. Cigarette 10 is inserted into cigarette holder 160 that includes a cigarette channel 154, wherein the cigarette 10 may be secured. First tube 142 is inserted or screwed into valve assembly 106 a predetermined distance not to impede on the valves inside valve assembly 106. In one embodiment, tube 142 can extend about half way up cigarette holder 160. Further, the valve assembly 106 includes two or more exhaling valves 162 on the bottom side of valve assembly 106 but housed therein and 'are disposed at two or more sides of the cigarette holder 160. Further, as illustrated, the top end 150 of the valve assembly 106 includes a top channel 164 which is in fluid connection with the inhaling valve 158 and the two or more exhaling valves 162, via various channels or the like. It may be seen that the inhaling valve 158 can be located in the middle of valve assembly 106. The bottom of valve assembly 106 includes tube attachment portion 161 that can be threaded to allow the tube to be screwed into valve assembly 106.

In one or more embodiments of the present disclosure, the inhaling valve 158 and the two or more exhaling valves 162 are one-way valves that allow air flow through only one direction. For instance, the inhaling valve 158 and the two or more exhaling valves 162 are check valves (which are also commonly known as non-return valve, reflux valve or retention valve). As may be seen from FIG. 9, the inhaling valve 158 is arranged such that when a user might provide suction pressure at the top channel 164 through a mouthpiece 174 mounted thereon, the inhaling valve 158 is disposed in open position (as inhaling valve flapper 166 thereof is lifted from corresponding inhaling hub 168 therein by the generated suction pressure), and the smoke from the burning of the cigarette 10 may travel via the top channel 164 to be inhaled by the user using mouthpiece 174. Mouthpiece 174 is secured to valve assembly 106 using mouthpiece holder 156. It may be understood that while the user is inhaling the smoke (i.e., when the inhaling valve 158 is open), the two or more exhaling valves 162 are disposed in closed positions (as flappers 170 thereof are pushed against corresponding exhaling hubs 172 therein by the generated suction pressure). Subsequently, when the user exhales the smoke by blowing into the cigarette channel 154, the inhaling valve 158 is disposed in closed position (as the inhaling valve flapper 166 is pushed against the inhaling hub 168 by the blowing pressure) and the two or more exhaling valves 162 are disposed in open positions (as the flappers 170 are pushed and lifted from the exhaling hubs 172 by the generated blowing pressure); and therefore the exhaled smoke may be expelled from the valve assembly 106. Top channel 164 can include orifices 162a along its side walls at predetermined angles that actuate the exhaling valves 162 when a user exhales into mouthpiece 174.

In some examples, as illustrated in the associated drawings, the apparatus 100 also includes a mouthpiece 174 which is coupled with the top channel 164 of the valve assembly 106. The mouthpiece 174 may generally be made of soft material, such as hard plastic, stainless steel or the like. The mouthpiece 174 in known manner takes a form such that it can be held readily and comfortably in the mouth by the user. As may be understood, the mouthpiece 174 provides an aperture (not shown) for the user to inhale the smoke from the burning of the cigarette 10 via the valve assembly 106 and further allows the user to exhale the smoke back into the valve assembly 106 for filtration and subsequent discharge thereof. In some examples, some filter (not shown) may also be provided inside the mouthpiece 174 to provide some form of desired filtration during inhaling of the cigarette smoke.

In the apparatus 100, the housing 102 has been designed so that it can easily be disassembled for cleaning and replacement of worn parts. Any flammable materials in the housing 102 are protected by non-flammable safeguards from spark or flame. The apparatus 100 allows for the cigarette holding unit 104 to retract into the housing 102, when not in use (as depicted in FIG. 1); and to slide the cigarette holding unit 104 out of the housing 102 to hold the cigarette 10 therein (as depicted in FIG. 1), when in use. It may be contemplated that the apparatus 100 can be adapted for cigars or cigarettes of different sizes and shapes by interchanging the cigarette holding unit 104, or even using a sleeve to hold and allow use of dry tobacco or herbs. Both the end openings 124, 130 may be capped when the apparatus 100 is not in use, so as to prevent residual odors from leaking when the fan 126 is OFF.

It is known that users like resistance when inhaling but not when exhaling. The present apparatus 100 affords the advantage of providing different levels of resistance between inhaling and exhaling of smoke from the cigarette 10 by employing two or more exhaling valves 162 (so as to offer easier flow of smoke and less resistance during exhaling process) and only one inhaling valve 158. That said, in other embodiments, the apparatus 100 may only employ single exhaling valves 162 without any limitations. It may be noted that all the electronic components (and also any mechanical, pneumatic or automatic components) are located inside the second chamber 114 in the first embodiment and the battery compartment 116a in the second embodiment. In both cases, all the electronic components are hermetically isolated from the first chamber 112 as there is risk of malfunction of such components from tar contamination or the like. Also, it may be appreciated that, in case of emergency, turning OFF the fan will also turn the cigarette 10 off due to oxygen deprivation, thus mitigating the risk of fire hazard. In the first embodiment, the first chamber 112 and the second chamber 114 are completely separated from each other. In the second embodiment, partition 102b separates the first chamber 112 and the second chamber 114 except at their top ends where they are connected using channel 102a. In the first embodiment, the battery can be cylindrical and in the second embodiment the battery can be flat.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cigarette filtration apparatus, comprising:
a valve assembly mounted to a housing that includes a filtration unit therein, said housing includes a combustion compartment opening that leads to a combustion compartment, said housing also includes a filtration compartment, said combustion compartment receives a tube that is mounted to said valve assembly, said filtration compartment includes said filtration unit, said combustion compartment includes a heating element, said valve assembly has a bottom end that is secures a cigarette having a tip and a butt, said bottom end secures said butt, said heating element is raised within said combustion compartment a height sufficient to light the tip of said cigarette, said heating element is powered by a battery located within said housing, and a fan located within said housing, said valve assembly includes a top end and a bottom side, said top end includes a top channel that leads to an inhaling valve, said top channel receives a mouthpiece, said bottom end includes a cigarette channel that receives the butt of said cigarette, said cigarette channel travels within said valve assembly, at least one exhaling valve mounted, adjacent said cigarette channel.

2. The filtration unit of claim 1 including an upper and a lower filtration unit.

3. The filtration unit of claim 2 wherein said upper or lower filtration unit is made of activated carbon and said upper or lower filtration unit is made of fiber material.

4. The housing of claim 1 having a bottom that includes filtration escape openings adapted to allow filtered air to be suctioned by said fan.

5. The housing of claim 1 wherein said battery is hermetically sealed within said housing in its own compartment.

6. The valve assembly of claim 1 wherein said inhaling valve cooperates with an inhaling valve flapper and said exhaling valves work with corresponding exhaling valve flappers.

7. The valve assembly of claim 1 wherein said top channel travels between said inner side walls, at least one orifice located along said inner side walls located adjacent to said top channel that cooperate with said exhaling valves.

8. The valve assembly of claim 1 wherein said tube is mounted to said valve assembly using a tube attachment portion located adjacent to said cigarette channel.

9. The cigarette filtration apparatus of claim 1 wherein at least two fans are located within said housing.

10. The cigarette filtration apparatus of claim 1 wherein said heating element is an ignition coil.

11. The cigarette filtration apparatus of claim 1 wherein a removable wire mesh is positioned under said heating element configured to catch ash and debris that falls from said cigarette.

12. The cigarette filtration apparatus of claim 1 wherein said tube is telescopic and said combustion compartment is long enough to completely house said tube.

13. The cigarette filtration apparatus of claim 1 wherein said heating element is raised within said combustion compartment a height sufficient to light the tip of said cigarette using a support column.

14. The cigarette filtration apparatus of claim 13 wherein said tube has a first diameter and said support column has a second diameter, wherein said first diameter is greater than said second diameter.

15. The cigarette filtration apparatus of claim 1 wherein said tube includes an O-ring adapted to keep said tube supported and sealed within said combustion compartment.

16. The cigarette filtration apparatus of claim 1 wherein said inhaling and exhaling valves are one-way valves.

17. The cigarette filtration apparatus of claim 1 wherein said valve assembly includes an inhaling valve that is configured to be disposed in a closed position when a user exhales into said tube through a mouthpiece, said valve assembly includes exhaling valves that are configured to being disposed in an open position when said user exhales into said tube using said mouthpiece.

18. The cigarette filtration apparatus of claim 1 wherein a level of resistance to a user inhaling or exhaling through said tube is adjusted by adding more or less inhaling or exhaling valves.

19. The cigarette filtration apparatus of claim 1 wherein said housing includes a step therein that provides access between the combustion compartment and the filtration compartment.

* * * * *